United States Patent [19]
Chen

[11] Patent Number: 5,921,792
[45] Date of Patent: *Jul. 13, 1999

[54] CARD CONNECTOR AND CARD-EJECTING MECHANISM

[75] Inventor: Robert Chen, Park Hsin-Chu, Taiwan

[73] Assignee: The Whitaker Corporation, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/880,321

[22] Filed: Jun. 23, 1997

Related U.S. Application Data

[63] Continuation of application No. 08/377,900, Jan. 25, 1995, abandoned.

[30] Foreign Application Priority Data

Mar. 10, 1994 [JP] Japan .................................. 6-066762

[51] Int. Cl.⁶ ................................... H01R 13/62
[52] U.S. Cl. ........................................... 439/160
[58] Field of Search .................... 439/152–160, 439/372

[56] References Cited

U.S. PATENT DOCUMENTS

| | | | |
|---|---|---|---|
| 5,033,972 | 7/1991 | Komatsu et al. | 439/153 |
| 5,152,697 | 10/1992 | Abe et al. | 439/152 |
| 5,299,946 | 4/1994 | Kusakabe | 439/159 |
| 5,451,168 | 9/1995 | Shuey | 439/159 |
| 5,507,658 | 4/1996 | Ho | 439/159 |
| 5,597,316 | 1/1997 | David et al | 439/159 |
| 5,634,805 | 6/1997 | Saito et al. | 439/159 |

FOREIGN PATENT DOCUMENTS

| | | |
|---|---|---|
| 0575832 A1 | 12/1993 | European Pat. Off. . |
| 0644624 A2 | 3/1995 | European Pat. Off. . |
| 0712178 A2 | 5/1996 | European Pat. Off. . |
| 0749096 A2 | 12/1996 | European Pat. Off. . |
| 0834827 A2 | 4/1998 | European Pat. Off. . |
| 1-116859 | 8/1989 | Japan . |
| 3-38772 | 3/1990 | Japan . |
| 3-38772 | 8/1991 | Japan . |
| 63-182078 | 6/1993 | Japan . |
| WO97/10691 A1 | 3/1997 | WIPO . |
| WO97/31511 A1 | 8/1997 | WIPO . |

*Primary Examiner*—Paula Bradley
*Assistant Examiner*—Tho D. Ta
*Attorney, Agent, or Firm*—Anton P. Ness; Katherine A. Nelson; Adrian J. LaRue

[57] ABSTRACT

A card-ejection mechanism and a card connector has a low profile for use with a memory card which can be manufactured by stamping from a thin metal sheet with subsequent forming. The card connector 10 includes a connector housing 20 and a card-ejection mechanism 30. The card-ejection mechanism comprises a fixed frame 40 and movable ejection parts 50. The frame 40 has two opposed guiding rails 42, 44 of a U-shaped cross section and an integral flat connecting plate 46 joining together guiding rails 42, 44. Approximately in the center of plate 46, a nearly square opening 46a is located. An ejecting blade 60 and an arm bar 70 are placed on opposite surfaces of this plate 46, and one end of the arm bar is joined by a pivoting rivet connection to the ejecting blade through the opening 46a; the other end of the arm bar 70 is linked to a push bar 80 attached to a side surface of the guiding rail 42. The mechanism is operated by pushing the push bar to partly eject the memory card therefrom.

16 Claims, 5 Drawing Sheets

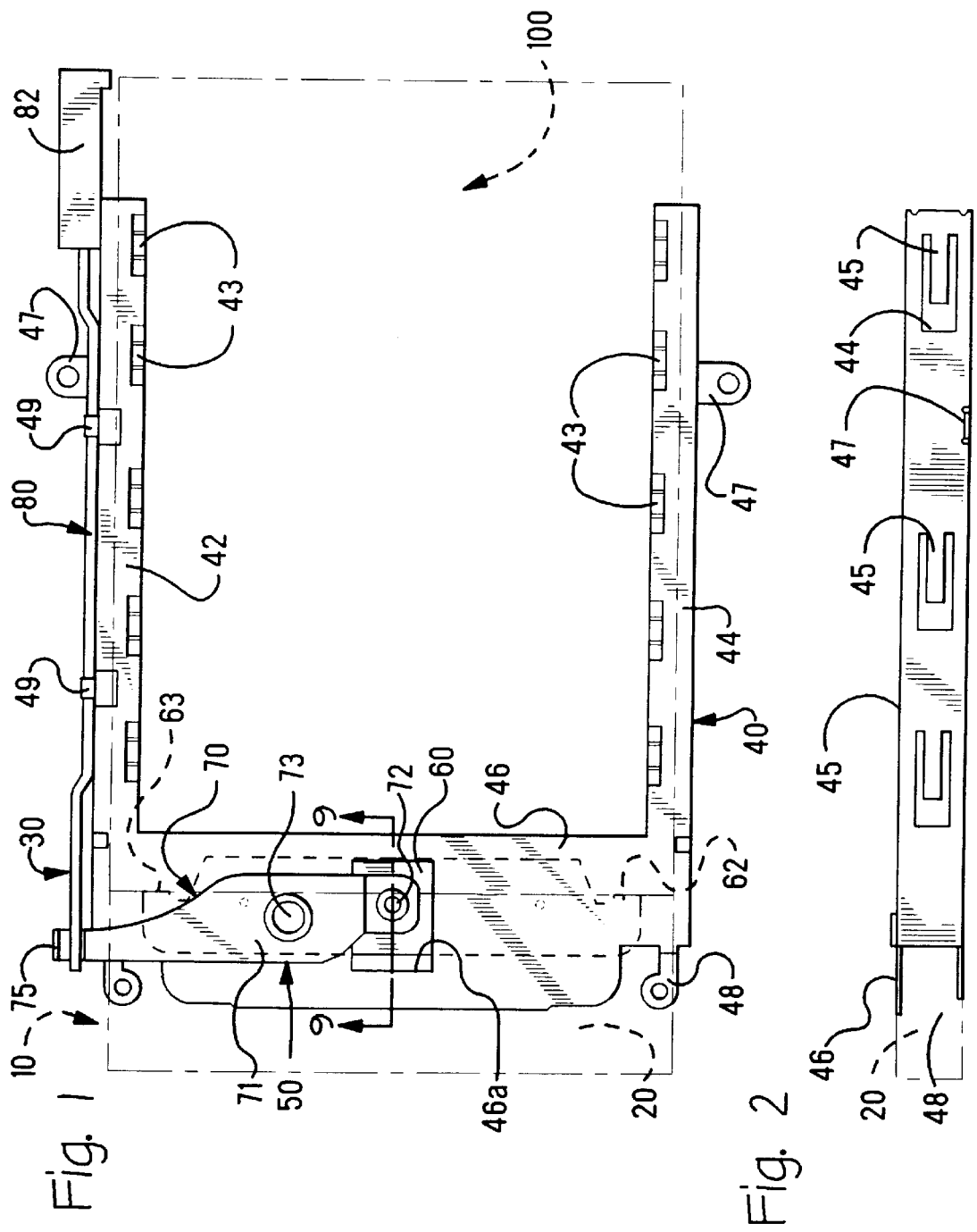

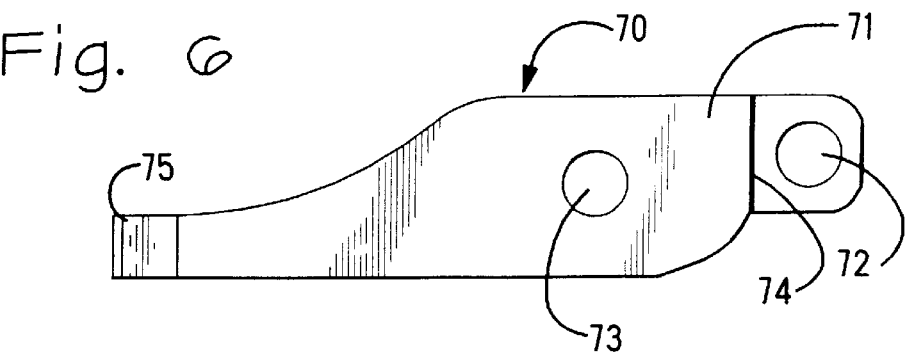
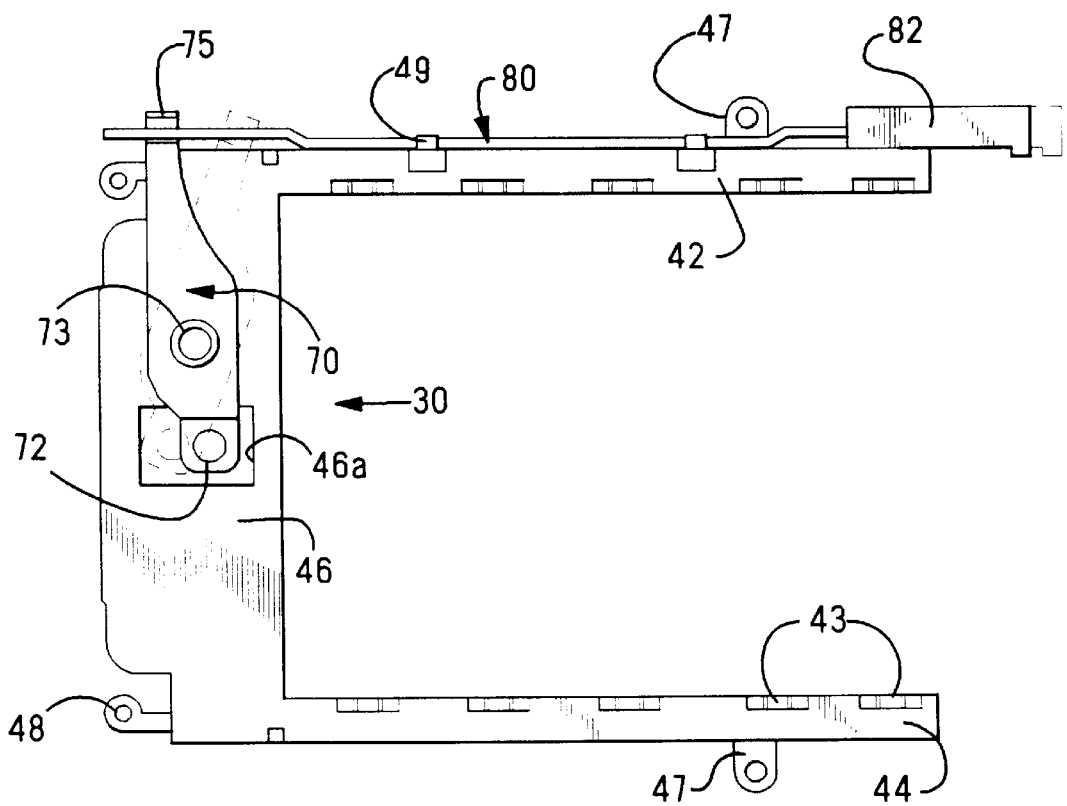

CARD CONNECTOR AND CARD-EJECTING MECHANISM

This application is a Continuation of application Ser. No. 08/377,900 filed Jan. 25, 1995, now abandoned.

FIELD OF THE INVENTION

This invention relates to card connectors, especially to memory (IC) card connectors and to card ejecting mechanisms used with such connectors.

BACKGROUND OF THE INVENTION

With the advances in the development and implementation of semiconductor based integrated circuit technology, the dimensions of electronic circuits and electronic apparatus and equipment in which these circuits are used are steadily decreasing. The miniaturization of active electronic components spurred not only reduction in size of the passive components but also of connectors, switches and other electrical components.

With the most recent achievements in IC technologies, it became possible to greatly increase volume of memory in semiconductor chips. As a result, recently developed and implemented IC memory cards for external memories of personal computers (PC) or for business electronic equipment, such as, for example, dynamic random access memory (DRAM) are not larger than a business card, while having very large memory volume. Using a number of such IC cards or memory cards storing various data or computer programs makes it possible to selectively connect electronic equipment depending on the requirements.

In order to be able to effectively use high-performance electronic equipment, it is necessary to switch from one memory card to another quickly, easily and correctly. For this purpose, electronic equipment is usually equipped with devices guiding memory cards to connect with a connector and ejecting them from the connector by means of a push bar or an operating lever with a push button. In such devices, an edge of a memory card inserted in the connector usually protrudes from a slot of the case, so that the edge can be grasped and pull the card out. The memory card connected to a memory card connector in this arrangement is completely enclosed inside the case of the electronic equipment and no part of it protrudes outside. This eliminates the danger of an accidental displacement of the memory card which can cause incorrect connection or loss of the information stored in the card.

Examples of conventional memory card connectors with a card ejection mechanism can be found in Japanese Utility Model Publication Nos. 91-38772, 85-182078 and 89-116859.

In the first of the above mentioned examples of the conventional card connectors, a plate parallel to the memory card is used. This plate has a pair of shoulders retaining the front and back ends of the memory card attached to or inserted in the plate, and a protrusion located at the other end which is connected to one end of a lever to which pressure from a spring loaded ejector is applied. This ejecting mechanism is mounted in a plastic frame having a supporting column to which the lever is attached so that it can rotate around it.

The second of the above mentioned examples of the conventional card connectors consists of a push lever, and a link and a triangular ejection lever mounted on a base plate connected in a pivoting manner. This connector is similar to the connector of the first example, and the difference is that the ejection lever and link are mounted on the base plate and are movable.

The third of the above mentioned examples of the conventional card connectors is similar to the second example. The difference consists in the fact that in the ejection mechanism, a U-shaped part having two arms is used when lever pressure is applied directly to the memory card.

Conventional memory card connectors and their ejecting mechanisms described above are not suitable for all modern superminiatuarized electronic equipment because of their dimensions. Namely, the card ejection mechanism of the first example is contained in a plastic housing. Therefore, its thickness combined with the thickness of the card limits its use in low-profile models. The card ejection mechanism of the second example has a movable ejection lever placed on the top of the base plate which serves as a guiding device for the memory card inserted under the base plate. In addition, a link is connected to the top of the ejection lever, thus considerably increasing the thickness of the mechanism. And finally, in the card ejection mechanism of the third example, the ejection arm located behind the memory card is rather long, thus increasing the length of the mechanism.

Therefore, the purpose of this invention is to offer an improved card connector having a very thin card ejecting mechanism.

Another purpose of this invention is to offer a card ejection mechanism for card connectors making it possible to smoothly and reliably insert memory cards in the connector and to eject them from it.

SUMMARY OF THE INVENTION

In order to eliminate the above disadvantages of conventional memory card connectors and card ejection mechanisms and to achieve the goals stated above, the card connector and card ejection mechanism according to this invention are basically made by stamping and forming from a thin metal sheet. The frame represents a single metal piece including a pair of parallel guiding rails connected by a flat plate. A flat ejecting blade and a flat arm are located on the upper and lower surfaces of the flat plate of the frame; they are connected together through an opening made in the plate. The arm is pivotally connected to the plate and to a push bar which is located along one side of the guiding rails. The connector housing is located at the back of the flat plate, and the inserted card engages lugs at both ends of the ejecting blade.

BRIEF DESCRIPTION OF THE DRAWINGS

Embodiments of the present invention will now be described by way of example with reference to the accompanying drawings in which:

FIG. 1 is a top view of the card connector and card-ejection mechanism according to this invention.

FIG. 2 is side view of FIG. 1.

FIGS. 6 and 7 are top and side views of a flat arm used in the card-ejection mechanism.

FIG. 8 is a view similar to FIG. 1 showing the operation of the card-ejection mechanism.

FIGS. 1 and 2 are top and side views of the card connector with the card-ejecting mechanism shown in the assembled state. The card connector 10 includes a connector housing 20 (shown by dotted lines) having electrical contacts secured therein and a card-ejecting mechanism 30. The connector housing 20 has an opening for the insertion (parallel to the circuit board) of a memory card. The housing may be made as a conventional box-shaped housing intended for the attachment to circuit boards. A typical example of such a housing 20 can be found in Japanese Utility Model Publication 92-15731. Housing 20 has a number of contacts (not shown) which form connections with the contacts (not shown) made on the front edge of the memory card (not shown). The contact sections of the contacts are retained inside the opening, and the soldering tails extend outside and are soldered to corresponding conductive traces on the circuit board. The difference of this connector housing from conventional models consists in the fact that it is shaped as a simple rectangle without guiding walls. The connector also can be made in the form of a long and narrow plastic housing having a rectangular cross section or in the form of a post header having a number of contacts penetrating through a side wall extending perpendicularly to its longitudinal direction.

Figure 3:
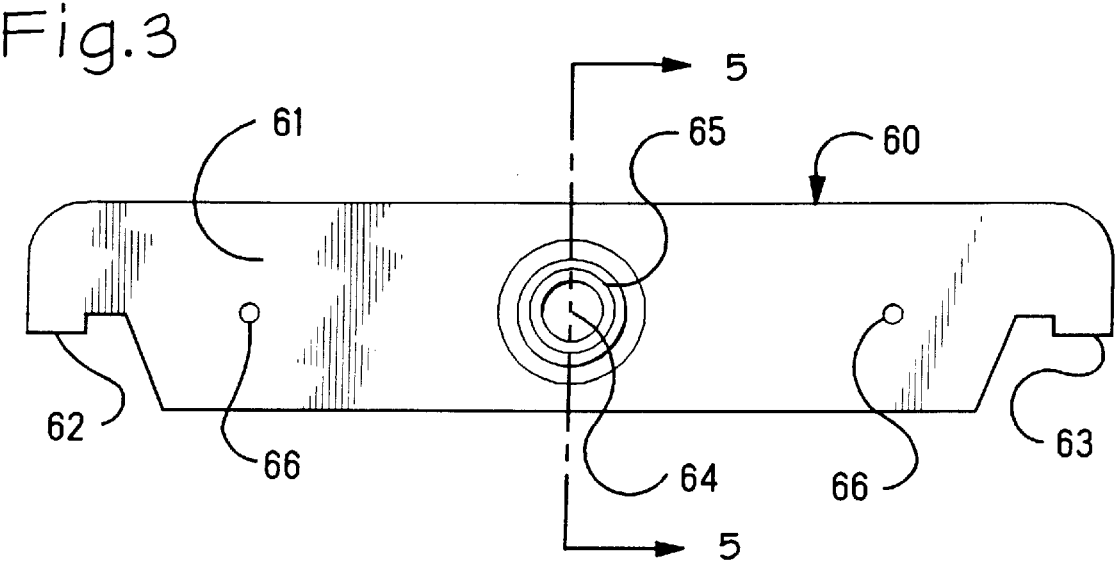
FIG. 3, 4, and 5 are top, front and cross-sectional views of an ejecting blade used in the card-ejection mechanism with FIG. 5 being taken along line 5—5 of FIG. 3.
Figure 4:
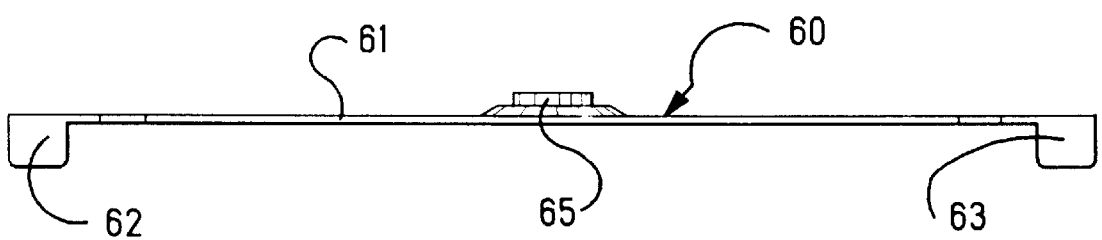

A card-ejection mechanism 30 is properly aligned with and attached to the connector housing 20. The card-ejection mechanism 30 includes a fixed frame 40 and a movable ejection section 50. In this embodiment, the fixed frame 40 comprises two parallel guiding rails 42, 44 and a flat plate 46 connecting them to each other. The frame 40 is preferably made of stainless steel by stamping and bending. The guiding rails 42, 44 are U-shaped in cross section and a conventional memory card 100 (shown by dotted lines) is inserted between them. In the upper and lower flanges of the guiding rails 42, 44, several embossings 43 protruding inside are formed. As shown in the FIGS. 2 and 11–13, in the side surfaces of the guiding rails 42, 44, resilient tongues 45 stamped and formed therefrom are arranged that their free ends protrude inside the guiding rails. Because of such a configuration, the memory card 100 can be smoothly inserted between the guiding rails 42, 44 and the conductive metal surfaces of the memory card engage the cantilevered tongues 45 and/or the embossings 43, thereby discharging static electricity, which may have been accumulated on the memory card 100, to the frame 40. Lugs 47, 48, as part of the guiding rails 42, 44, have at their centers holes for the mounting of the card-ejection mechanism 30 and the connector housing 20 to the circuit board. In addition, guiding rail 42 has retaining clips 49 formed by cutting and bending from the same metal sheet as the guiding rail 42. These retaining clips 49 secure push bar 80 therein so that it can move along the rail as will be described hereinbelow.

Figure 5:
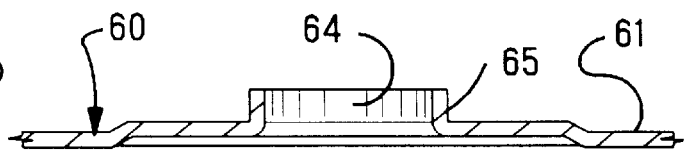

Next, a specific embodiment of the ejecting blade 60 and the arm bar 70 constituting the movable parts of the ejector 50 with reference to FIGS. 1 and 3–9 will be explained. As can be discerned, the ejecting blade 60 is located along the bottom of the plate 46 which has a nearly square opening 46a at the center thereof. At both ends of the ejecting blade 60, substantially square lugs 62, 63 are located. These lugs 62, 63 are substantially perpendicular to the main body 61 of the ejecting blade 60, and they are intended to apply an ejection force against the front edge of the memory card 100. As can be seen in FIG. 5, nearly at the center of ejecting blade 60, an opening 64 surrounded by an annular wall 65 is located. This opening 64 and the annular wall 65 can be made by a conventional punching operation applied to the main body 61 of the ejecting blade 60. The annular wall 65 is aligned with and inserted in the opening 46a of plate 46.

Figure 9:
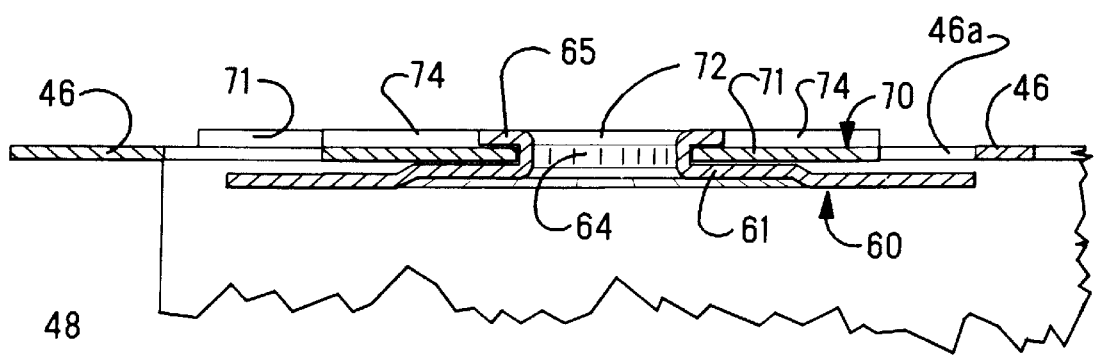
FIG. 9 is a cross-sectional view along the line 9—9 of FIG. 1.

The arm bar 70, as is best shown in the FIGS. 6 and 7, has a first hole 72 near its one end and a second hole 73 in the flat central portion 71. Between the first hole 72 and the second hole 73, an offset is provided at a transitional line 74 equal to nearly the thickness of the plate 46 (see FIG. 7). A hook 75 is located at the other end of the arm bar 70. Here, attention is drawn to the fact that the central portion 71 of arm bar 70 is arranged flatly against the upper surface of the plate 46, and the offset end containing hole 72 fits inside the opening 46a as shown in FIG. 9.

Next, an explanation concerning relationship between the fixed frame 40 having the plate 46 and the movable ejector 50 including the ejecting blade 60 and the arm bar 70 is provided. First, the second hole 73 of the arm bar 70 is aligned with the rivet hole (not shown in the drawing) of the plate 46, and the arm bar 70 is attached to plate 46 thereby so that it can be pivotally operated as described below. Then, the offset end of the arm bar 70 having the first opening 72 is placed into the opening 46a of the plate 46. Next, the ejecting blade 60 is placed under the plate 46 of the fixed frame, the annular wall 65 for riveting is passed through the first opening 72 of the blade 60 and the arm 70 is fixed by riveting so that it can pivot. An enlarged cross section of this rivet connection is shown in FIG. 9, where it can be seen that the joint is a close-fitting pivot section that is recessed within opening 46a of the plate 46. Upstanding annular wall 65 fits in a close fit within hole 72 of arm bar 70, thereby joining the two parts while reducing the space around the annular wall to a minimum necessary to permit pivoting, and eliminating all unnecessary play during activation of the ejecting mechanism.

The end of annular wall 65 is flattened outwardly after insertion through hole 72 to complete the joint, in rivet fashion defining a low profile joint. It can be seen in FIG. 9 that the upper surface of flange 65 after flattening is no higher than the remainder of arm bar 70 outwardly of transitional line 74, since it is disposed just above the offset central portion 71 of arm bar 70. The pivotal connection thus has a dimension orthogonal to plate 46 that is minimized, since no thickeness of plate 46 is found in the pivotal connection. The connection between the plate 46 and the second hole 73 of the arm bar 70 (not shown in the drawing) is made similarly to the connection shown in FIG. 9. It must be noted that since one end of the arm bar 70 is offset to a thickness equal to that of the plate 46, the top of the wall for the riveting is practically at the same level as the upper surface of the flat section 71 of the arm bar 70. This makes the entire structure very thin.

Figure 10:
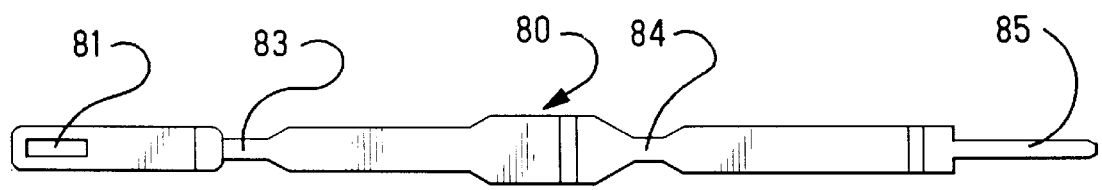
FIG. 10 is a top view of the push bar used in the card-ejection mechanism.
Figure 11:
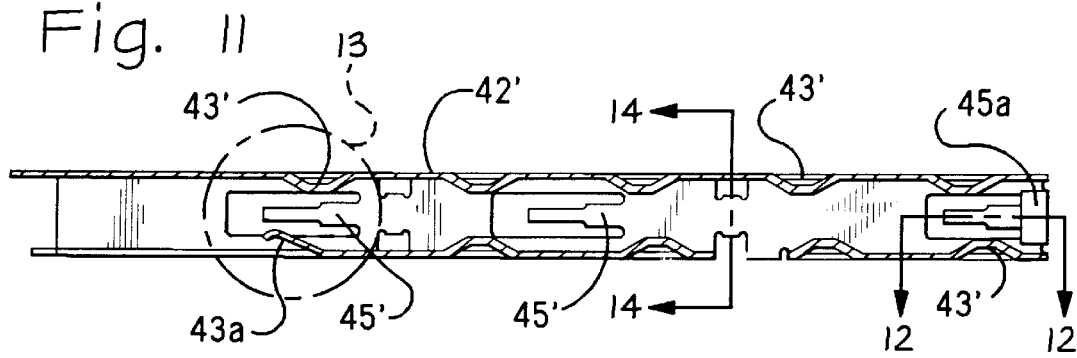
FIG. 11 is a cross-sectional view of an alternative embodiment of the metal frame.
Figure 12:
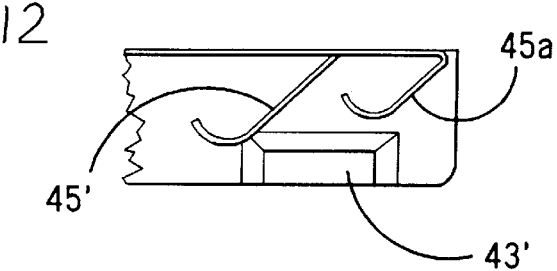
FIG. 12 is a view taken along line 12—12 of FIG. 11.
Figure 13:
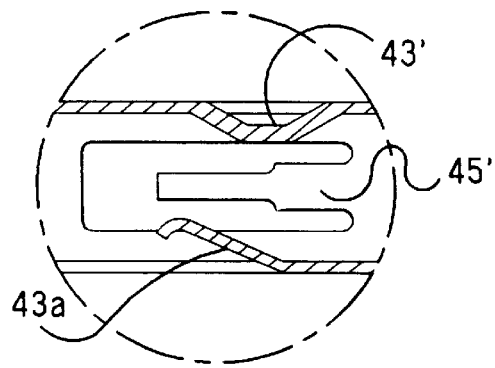
FIG. 13 is an enlarged view taken from the broken line circle 13 of FIG. 11.
Figure 14:
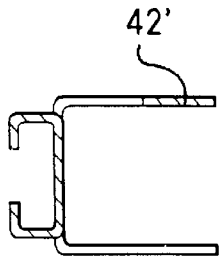
FIG. 14 is a cross-sectional view taken along line 14—14 of FIG. 11.

As described above, the ejecting blade 60 and the arm bar 70 located above and below the plate 46 of the fixed frame 40 form a pivoting connection at the second hole 73, and it is obvious that when the other end of the arm bar 70 is pushed, the ejecting blade 60 moves back and forth along the bottom surface of the plate 46. The hook 75 of the arm bar 70 fits into a rectangular hole 81 provided at one end of a push bar 80. Push bar 80 is shown in FIGS. 1 and 8, and an enlarged top view thereof is shown in FIG. 10. This push bar 80 can be stamped, for example, from a 1 mm thick stainless steel sheet. At the opposite end of the hole 81 of the push bar 80, a relatively thin operating end 85 is provided. A push button 82, made preferably of plastic, can be attached to this end. In the middle section of push bar 80, necked-down sections 83, 84 are located at a certain distance from each other. Locations of these sections 83, 84 correspond to the positions of guiding clips 49 in the guiding rail 42 of the fixed frame 40. After the necked-down sections 83,84 are positioned next to clips 49, they are pressed under them, thus mounting the push bar 80 along the guiding rail 42 so that it can slide along the surface of the rail. At the same time, the hook 75 of the arm bar 70 is joined with the hole 81 of the push bar 80.

Now, the operation of the card-ejecting mechanism is explained. FIG. 1 depicts the normal position when the memory card 100 is completely inserted and completely connected within the card connector 10. However, when the push button 82 of the push bar 80 is pressed inwardly, the arm bar 70 rotates in a counterclockwise direction and moves the ejecting blade 60 forward thereby ejecting memory card 100. As a result of this action, the back end of the memory card 100 protrudes from the surface of the case, whereby the memory card can be easily pulled out of the card connector and card-ejecting mechanism.

FIG. 8 illustrates the operation of the card-ejection mechanism 30 when it is in position when the push bar 80 is depressed ejecting the memory card as shown by solid lines; and when it is moved forward to receive the memory card as shown by dotted lines. Since the arm bar 70 can rotate around the second hole 73, the end having the first hole 72, in the position when the push bar 80 is depressed, moves to the right, thus ejecting the memory card (not shown in the drawing) and disconnecting it from the connector. On the other hand, when the memory card is inserted along the guiding rails 42, 44, the ejecting blade 60 is pushed to the left and the arm bar rotates clockwise, thus shifting the push bar 80 and the push button 82 to the right in the position shown by dotted lines. In this position, the lugs 62, 63 of the ejecting blade 60 engage the inner end of the memory card 100, which results in the ejection of the memory card 100 when the card-ejection mechanism is operated.

FIG. 9 shows a low-profile pivot connection between first, second and third plate-like member generally parallel to each other at a pivot location, with second plate-like member disposed between the first and third plate-like members. The first second and third plate-like members have respective pivot sections at the pivot location enabling at least the first and third plate-like members to relatively pivot. The pivot section of the second plate-like member comprises a large opening therethrough; the pivot section of the first plate-like member comprises an offset plate-like portion disposed in the large opening through the second plate-like member and has a hole therethrough. The pivot section of the third plate-like member comprises an upstanding annular wall extending though the large opening and through the hole to an edge portion that is deformed against the first plate like member surrounding the hole.

As can be understood from the above explanations and the drawings, the card ejection mechanism according to this invention is of a very simple design, and it is very thin. This very low thickness is achieved by placing moving elements 60, 70 above and below the plate 46 and by connecting them through the opening 46a. In addition, the movement of the push bar 80 causing the arm bar 70 to rotate always works because the offset portion 74 of the arm bar is situated inside the opening 46a.

Above, an explanation, with reference to the appended drawings concerning the preferred embodiment of the card connector 10 and its card ejection mechanism 30, has been given according to this invention. However, it must be understood that this invention is not limited to only this specific embodiments but also covers various modifications which can be done by experts in the art without deviation from essential elements of the invention.

An example of one such modification will be explained with reference to FIGS. 11–14 of the guiding rail 42' which corresponds to the guiding rail 42 shown in FIG. 1.

The major differences of the modified embodiment depicted in FIGS. 11–14 compared to the first embodiment are as follows:

At the front end of the guiding rail, that is at the end at which the memory card is inserted, relatively small spring members 45a are bent inside from the side wall. This makes the insertion of the memory card easier.

Resilient tongues 45' are shaped as inverted T's which increases their elasticity, thus improving contact with the grounding conductor of the memory card 100.

Among the embossings 43' made on the upper and lower walls of the guiding rails, the one which is located at the furthest point from the front end is replaced by a resilient arc-shaped tongue 43a which facilitates the guiding and setting of the memory card 100.

As follows from the above explanation, the card connector and the card ejection mechanism according to this invention are distinguished by a simple design and a very thin profile due to the fact that they are made basically from a thin metal sheet by stamping and forming, and that the ejecting blade and the arm bar are placed on opposite sides of a plate of the frame and connected together in a pivoted manner through an opening made in the plate, the connection being made by riveting using extrusions formed in the parts being connected. The effect of this invention for electronic equipment in which memory cards are used is obvious. In addition, since the offset end of the arm bar is riveted to the ejecting blade inside the opening made in the plate, it makes it possible to obtain not only a low profile of the card-ejection mechanism but also an assured operation of the push bar. The guiding rails of the fixed frame equipped with resilient tongues and embossings in the upper, lower and side walls enables the insertion of the memory card to be smoother and effectively eliminates static electricity.

I claim:

1. A card connector and a card-ejection mechanism, comprising:

a metal frame having guiding sections interconnected by a plate;

an electrical connector extending along an end of said plate so positioned to mate with a card fully inserted into the metal frame;

an arm member pivotally mounted onto said plate along one surface thereof;

an ejecting member extending along an opposed surface of said plate and having spaced card-engaging members for engaging an end of the card when the card positioned within said metal frame is to be ejected, said ejecting member being pivotally connected to said arm member through an opening in said plate to define a pivotal connection, and said arm member including an offset portion disposed within said opening, and said pivotal connection comprises an annular wall on said ejecting member disposed in a complementary hole in said offset portion, whereby a dimension of said pivotal connection orthogonal to said plate is minimized defining a low profile; and a push bar connected to said arm member to pivotally move the arm member thereby moving said ejecting member to partly eject the card from said metal frame.

2. A card connector and card-ejection mechanism as claimed in claim 1, wherein said push bar is movably mounted along one of said guiding sections.

3. A card connector and card ejecting mechanism as set forth in claim 1 wherein said annular wall is integrally formed on said ejecting blade.

4. A card-ejection mechanism of a card connector for ejecting a card therefrom, comprising:

a frame having opposed guiding rails along which the card is guided for connection to an electrical connector adjacent an inner end of said frame;

a plate of said frame at said inner end interconnecting said guiding rails;

an ejecting blade disposed along one surface of said plate and movable therealong for engaging the card at spaced locations to partly eject the card;

an arm bar pivotally mounted to said plate, movable along an opposed surface of said plate and being pivotally connected to said ejecting blade to move said ejecting blade along said plate, said ejecting blade being pivotally connected to said arm bar through an opening in said plate to define a pivotal connection, and said arm bar including an offset portion disposed within said opening, and said pivotal connection comprises an annular wall on said ejecting blade disposed in a complementary hole in said offset portion, whereby a dimension of said pivotal connection orthogonal to said plate is minimized defining a low profile; and a push bar movably mounted along one of said guiding rails and connected to said arm bar to move said arm bar.

5. A card-ejection mechanism as claimed in claim 4, wherein said ejecting blade has lugs at both ends for engaging the card.

6. A card-ejection mechanism as claimed in claim 4, wherein said guiding rails have inwardly-directed resilient tongues for engaging sides of the card.

7. A card-ejection mechanism as claimed in claim 4, wherein said one of said guiding rails has retaining clips for mounting said push bar thereon for movement therealong.

8. A card ejecting mechanism as set forth in claim 4 wherein said annular wall is integrally formed on said ejecting blade.

9. A card-ejection mechanism as claimed in claim 4, wherein said guiding rails have inwardly-directed bosses for engaging the top and bottom surfaces of the card.

10. A card-ejection mechanism as claimed in claim 9, wherein a resilient arc-shaped tongue is located at inner end of said guiding rails.

11. A card-ejection mechanism as claimed in claim 9, wherein spring members are located at ends of said guiding rails.

12. A card-ejection mechanism of a card connector for ejecting a card therefrom, comprising:

a frame having opposed guiding rails along which the card is guided for connection to an electrical connector adjacent an inner end of said frame;

a plate of said frame at said inner end interconnecting said guiding rails, said plate having an opening therethrough;

an arm member extending along one surface of said plate and being pivotally mounted thereto and having an offset portion positioned within said opening;

an ejecting blade disposed along an opposed surface of said plate and movable therealong for engaging the card at spaced locations to partly eject the card from said frame;

pivot members provided by said offset portion of said arm member and said ejecting blade pivotally connecting said offset portion and said ejecting blade together to move said ejecting blade along said plate without any play between said arm member and said ejecting blade upon pivotal movement of said arm member relative to said plate, said pivot member of said ejecting blade comprises an annular wall disposed in a complementary hole in said offset portion, and a top end of said annular wall extends no higher than a top surface of said arm member spaced from said offset portion; and a push bar connected to an end of said arm member and movably mounted along one of said guiding rails to move said arm member.

13. A card-ejection mechanism as claimed in claim 12, wherein the one of said guiding rails has retaining clips for mounting said push bar thereon.

14. A card ejecting mechanism as set forth in claim 12 wherein said annular wall is integrally formed on said ejecting blade.

15. A card-ejection mechanism comprising:

first, second and third plate-like members generally parallel to each other at a pivot location, with said second plate-like member disposed between said first and third plate-like members, said first, second and third plate-like members having respective pivot sections at said pivot location enabling at least said first and third plate-like members to relatively pivot, said pivot section of said second plate-like member comprising a large opening therethrough, said pivot section of said first plate-like member comprising an offset plate-like portion disposed in said large opening through said second plate-like member and having a hole therethrough, and said pivot section of said third plate-like member comprising an upstanding annular wall extending through said large opening and through said hole to an edge portion that is deformed against said first plate-like member surrounding said hole, all whereby said pivot connection defines a low profile;

said second plate-like member being connected to card guiding members and including mounted thereon an electrical connector matable with a complementary connector on a card insertable along said card guiding members;

one of said first and third plate-like members is an arm member mounted onto said second plate-like member and connected to a push bar movably mounted along one of said card guiding members to move said arm member; and the other of said first and third plate-like members is an ejection blade movable along said second plate-like member for engaging said card at spaced locations to partly eject said card from said card guiding members.

16. The card ejection mechanism as set forth in claim 15 wherein said arm member is said third plate-like member and said ejection blade is said first plate-like member.

* * * * *